United States Patent
Yanase

(10) Patent No.: US 8,858,297 B2
(45) Date of Patent: Oct. 14, 2014

(54) GEAR GRINDING METHOD

(75) Inventor: Yoshikoto Yanase, Tokyo (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 123 days.

(21) Appl. No.: 13/699,475

(22) PCT Filed: Jun. 13, 2011

(86) PCT No.: PCT/JP2011/063538
§ 371 (c)(1),
(2), (4) Date: Jan. 18, 2013

(87) PCT Pub. No.: WO2011/158807
PCT Pub. Date: Dec. 22, 2011

(65) Prior Publication Data
US 2013/0115856 A1    May 9, 2013

(30) Foreign Application Priority Data
Jun. 16, 2010    (JP) .................. 2010-136812

(51) Int. Cl.
*B24B 19/00* (2006.01)
*B23F 19/00* (2006.01)
*B23F 5/02* (2006.01)
*B23F 23/00* (2006.01)

(52) U.S. Cl.
CPC ............. *B24B 19/00* (2013.01); *B23F 19/002* (2013.01); *B23F 5/02* (2013.01); *B23F 23/00* (2013.01)
USPC .............................................. 451/8; 451/47

(58) Field of Classification Search
USPC .......................................... 451/5, 8, 9, 10, 47
See application file for complete search history.

(56) References Cited

U.S. PATENT DOCUMENTS

| | | | |
|---|---|---|---|
| 4,400,916 A * | 8/1983 | Bloch et al. | .................. 451/21 |
| 5,761,067 A | 6/1998 | Alford et al. | |
| 8,506,214 B2 * | 8/2013 | Ribbeck et al. | .............. 409/27 |
| 2010/0023297 A1 | 1/2010 | Kikuchi et al. | |

FOREIGN PATENT DOCUMENTS

| | | | |
|---|---|---|---|
| EP | 0631211 A2 | 12/1994 |
| JP | 7-51936 A | 2/1995 |
| JP | 2000-517247 A | 12/2000 |
| JP | 2003-236720 A | 8/2003 |
| JP | 2008-110445 A | 5/2008 |
| WO | WO 97/37290 A1 | 10/1997 |
| WO | WO 2008/053769 A1 | 5/2008 |

* cited by examiner

*Primary Examiner* — Robert Rose
(74) *Attorney, Agent, or Firm* — Birch, Stewart, Kolasch & Birch, LLP

(57) ABSTRACT

Provided is a gear grinding method wherein an initial cutting position by a grindstone is appropriately set, resulting in an improvement being able to be made in machining accuracy. For this purpose, the gear grinding method is such that rotation of a workpiece (W) about a workpiece rotation axis (C), cutting by a grindstone (15) in the X-axis direction, and feeding of the grindstone (15) in the Z-axis direction are controlled, resulting in the workpiece (W) being ground by the grindstone (15). In this method, measurement points (P1-P9) are set in a grid-like pattern on a left tooth surface (WL) and a right tooth surface (WR) of a predetermined tooth (Wa) of the workpiece (W); rotation phases about the workpiece rotation axis (C) at the measurement points (P1-P9) are detected; tooth thickness deviation amounts (e) between a reference involute tooth surface and the measurement points (P1-P9) on the left and right tooth surfaces, as well as tooth thickness deviation amounts (e) between the involute tooth surface and corresponding points (Q1-Q9) on all teeth other than the tooth (Wa), are obtained on the basis of the detected rotation phases; and an initial cutting position (X1) for the grindstone (15) is set on the basis of the largest of the deviation amounts (e).

5 Claims, 3 Drawing Sheets

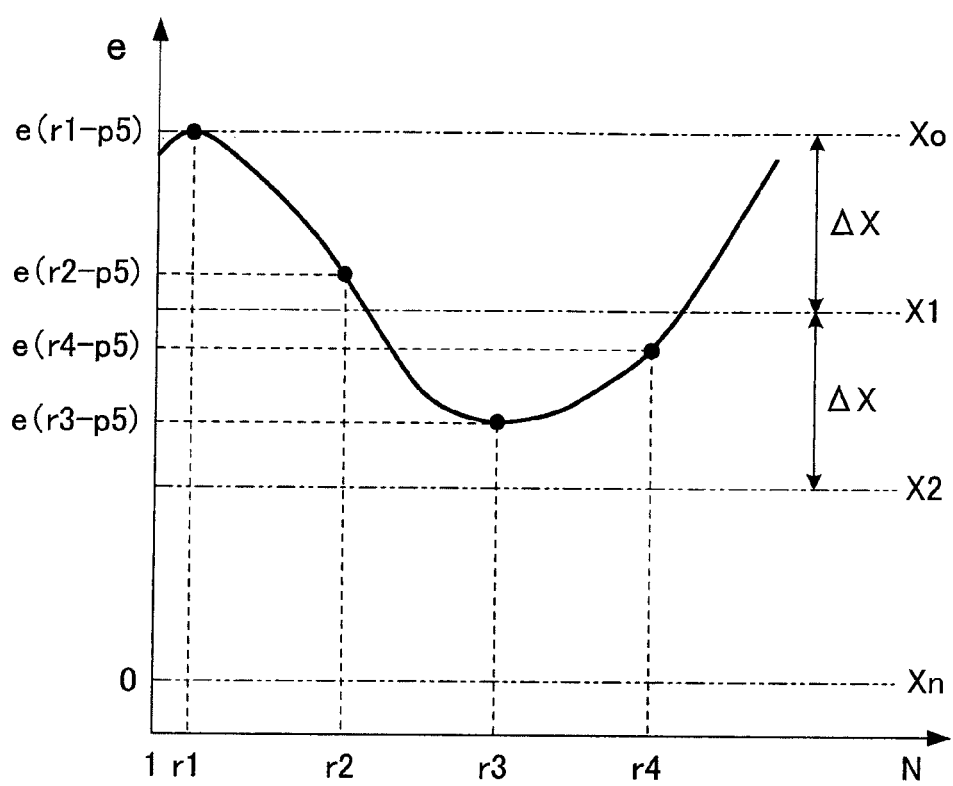

GEAR GRINDING METHOD

TECHNICAL FIELD

The present invention relates to a gear grinding method in which when a gear to be machined is ground, an initial cutting position of a grinding wheel in a cutting direction is appropriately set.

BACKGROUND ART

Conventionally, as a method of grinding and finishing a gear, a profile grinding method has been provided in which a tooth surface of a gear is finished in form grinding by a grinding wheel. In such profile grinding, a grinding wheel meshed with a gear is first moved in a radial direction of the gear so as to be positioned at a machining start position which is set on an initial cutting position. Then, this grinding wheel is moved in a direction of a rotation axis of the gear (on the initial cutting position) so as to grind one tooth or one tooth space of the gear. Subsequently, when initial (first round) grinding of all the teeth or all the tooth spaces is completed, the grinding wheel is moved from the first cutting position to an inner side in the radial direction of the gear by a predetermined cutting amount. Thereafter, one tooth or one tooth space is ground again. Next, such grinding operations are repeatedly performed until the gear is ground to a final cutting position. As a result, the gear is ground and finished.

In addition, as a method of grinding and finishing a gear, a generating grinding method has been provided in which a tooth surface of a gear is finished by a threaded grinding wheel. In such generating grinding, a threaded grinding wheel and a gear meshed with each other are rotated in a synchronized manner to grind and finish the gear.

Accordingly, as in the case of the profile grinding, in the generating grinding as well, the grinding wheel needs to be meshed and positioned at a machining start position which is set on an initial cutting position, before the grinding. Such a gear grinding method is disclosed in Patent Document 1, for example.

PRIOR ART DOCUMENT

Patent Document

Patent Document 1: Japanese Patent Application Publication No. 2008-110445

SUMMARY OF THE INVENTION

Problems to be Solved by the Invention

The above conventional gear grinding method is such that while a gear is being rotated, rotation phases of both left and right tooth surfaces of all the teeth thereof are detected, and meshing is performed on the basis of these detected results, whereby a threaded grinding wheel is positioned at a machining start position on an initial cutting position.

In general, when heat treatment is performed on a gear, strain is caused in the gear because of the thermal stress. For this reason, depending on an initial cutting position of a grinding wheel, irrespective of profile grinding or generating grinding, the grinding wheel sometimes cuts into a tooth surface of the gear too deeply immediately after the start of machining due to the influence of the strain of the gear. When the cutting by the grinding wheel is too deep as described above, a grinding burn of the grinding wheel occurs easily, thus possibly leading to a reduction in machining accuracy.

In addition, it is conceivable that the initial cutting position of the grinding wheel is set in such a way that the grinding wheel does not cut into the tooth surface of the gear too deeply. However, in the case of generating grinding, when the strain of the gear is large, the grinding wheel for performing grinding on the initial cutting position sometimes falls into a no-contact (air cutting) state in which the grinding wheel does not come into contact with the tooth surface. Thereby, the no-contact grinding operation of the grinding wheel is wasted, thus possibly leading to a loss in machining time.

Accordingly, the present invention has been made to solve the above problems, and an object thereof is to provide a gear grinding method in which an initial cutting position of a grinding wheel is appropriately set, allowing an improvement in machining accuracy.

Means for Solving the Problems

A gear grinding method according to a first invention to solve the above problems is a gear grinding method in which rotation of a gear to be machined about a workpiece rotation axis, cutting by a grinding wheel in a radial direction of the gear to be machined, and feed of the grinding wheel in a workpiece rotation axis direction are controlled to grind the gear to be machined by the grinding wheel, the gear grinding method characterized in that the gear grinding method comprises:

setting measurement points on both left and right tooth surfaces of a predetermined tooth of the gear to be machined;

detecting rotation phases about a workpiece rotation axis at the measurement points;

obtaining tooth thickness deviation amounts between a preset reference involute tooth surface and the measurement points, as well as tooth thickness deviation amounts between the preset reference involute tooth surface and corresponding points corresponding to the measurement points and located on both left and right tooth surfaces of all teeth other than the predetermined tooth, on the basis of the detected rotation phases; and setting an initial cutting position of the grinding wheel on the basis of the largest of the deviation amounts.

A gear grinding method according to a second invention to solve the above problems is characterized in that the gear grinding method further comprises:

determining on the basis of the deviation amounts and cutting positions from the initial cutting position to a final cutting position whether or not the grinding wheel comes into contact with the left tooth surface and the right tooth surface for each of the cutting positions, the cutting being made stepwise from the initial cutting position to the final cutting position; and providing the grinding wheel with no feed in the workpiece rotation axis direction at the cutting positions of the left tooth surface and the right tooth surface determined as where the grinding wheel does not come into contact.

A gear grinding method according to a third invention to solve the above problems is characterized in that the predetermined tooth is a set of teeth placed at equal angular intervals in a circumferential direction of the gear to be machined.

A gear grinding method according to a fourth invention to solve the above problems is characterized in that the measurement points are three points set in a center area in a tooth width direction and both side areas in the tooth width direction of a center portion in a tooth depth direction, on both the left tooth surface and the right tooth surface of the predetermined tooth.

A gear grinding method according to a fifth invention to solve the above problems is characterized in that the measurement points are nine points set in a grid pattern on both the left tooth surface and the right tooth surface of the predetermined tooth.

Effect of the Invention

Thus, according to the gear grinding method of the present invention, the initial cutting position of the grinding wheel is set on the basis of the tooth thickness deviation amounts of the gear to be machined from the preset reference involute tooth surface. Thereby, the cutting by the grinding wheel immediately after the start of the machining does not become too deep and thus a grinding burn of the grinding wheel can be avoided. Accordingly, it is possible to improve machining accuracy.

BRIEF DESCRIPTION OF THE DRAWINGS

FIG. 3 is a diagram showing an approximate curve of deviation amounts for each of measurement points and corresponding points corresponding to the measurement points.

MODE FOR CARRYING OUT THE INVENTION

A detailed description will be given below of a gear grinding method according to the present invention with reference to the drawings.

Embodiment

Figure 1:
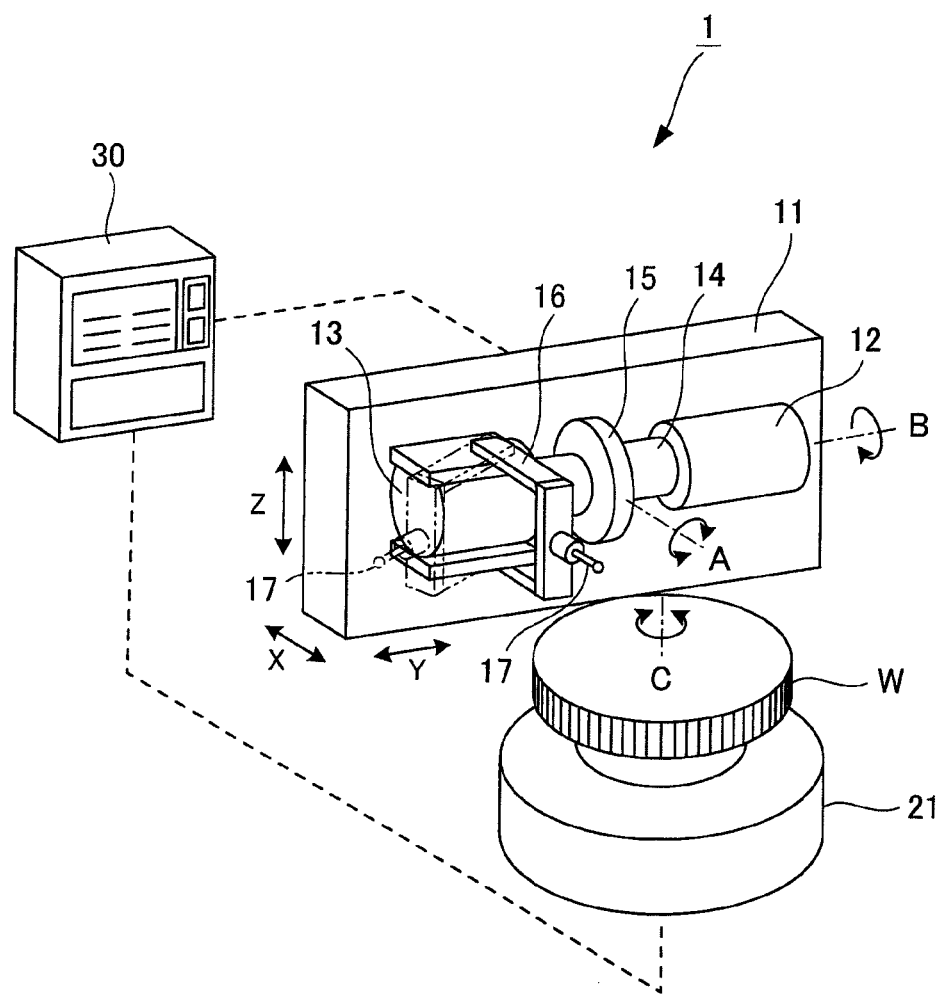
FIG. 1 is a schematic diagram of a gear grinding machine to which a gear grinding method according to an embodiment of the present invention is applied.

As shown in FIG. 1, in a gear grinding machine 1, a rotary table 21 is supported to be rotatable about a vertical workpiece rotation axis C. Then, a workpiece W (gear to be measured, gear to be machined) is attached attachably and detachably to an upper surface of the rotary table 21. Accordingly, the workpiece W can be rotated about the workpiece rotation axis C by driving the rotary table 21.

In addition, in the gear grinding machine 1, a grinding wheel head 11 is provided to face the rotary table 21. Then, the grinding wheel head 11 is movable in X-, Y-, and Z-axis directions showing three orthogonal axis directions of front-rear, left-right, and up-down, respectively. Additionally, the grinding wheel head 11 is supported turnably about a horizontal grinding wheel turning axis A.

A grinding wheel driving motor 12 and an arbor supporter 13 are provided on a front surface of the grinding wheel head 11. Between the grinding wheel driving motor 12 and the arbor supporter 13, a grinding wheel arbor 14 is supported to be rotatable about a grinding wheel rotation axis B. Then, a grinding wheel 15 for profile grinding designed to grind the workpiece W is mounted attachably and detachably on an outer circumferential portion of the grinding wheel arbor 14.

Moreover, a measurement head 16 in a portal shape is supported on the front surface of the grinding wheel head 11 so as to be pivotable in such a manner that the measurement head 16 extends across the arbor supporter 13 from above and below. A measurement probe 17 serving as a contact-type sensor is provided at a tip end portion of the measurement head 16.

Accordingly, by driving the grinding wheel head 11, the grinding wheel 15 can be moved in the X-, Y-, and Z-axis directions and turned about the grinding wheel turning axis A. Specifically, by turning the grinding wheel head 11 about the grinding wheel turning axis A, an attachment position (attachment angle) of the grinding wheel 15 can be adjusted in accordance with a helix angle of the workpiece W. In addition, by driving the grinding wheel driving motor 12, the grinding wheel 15 can be rotated about the grinding wheel rotation axis B.

Furthermore, by driving the measurement head 16, the measurement probe 17 can be pivoted between a retreat position where the measurement probe 17 faces the front surface of the grinding wheel head 11 and a measurement position where the measurement probe 17 is moved away toward the front from the front surface of the grinding wheel head 11. Then, by driving the grinding wheel head 11 with the measurement probe 17 being placed at the measurement position, the measurement probe 17 can be moved in the X-, Y-, and Z-axis directions. Specifically, by driving the grinding wheel head 11, the measurement probe 17 can be brought into contact with a left tooth surface WL and a right tooth surface WR of a tooth Wa of the workpiece W (see FIG. 2).

Then, in the gear grinding machine 1, an NC device 30 for integrally controlling the entire gear grinding machine 1 is provided. The NC device 30 is connected to the grinding wheel head 11, the grinding wheel driving motor 12, the measurement head 16, the rotary table 21 and the like, for example.

In this way, in the NC device 30, rotation of the workpiece W about the workpiece rotation axis C, cutting by the grinding wheel 15 in the X-axis direction (in the radial direction of the workpiece W), and feed of the grinding wheel 15 in the Z-axis direction (in the direction of the workpiece rotation axis C) are controlled on the basis of inputted workpiece (gear) specifications and machining (grinding) conditions. Thereby, the workpiece W can be ground by the grinding wheel 15.

Figure 2:
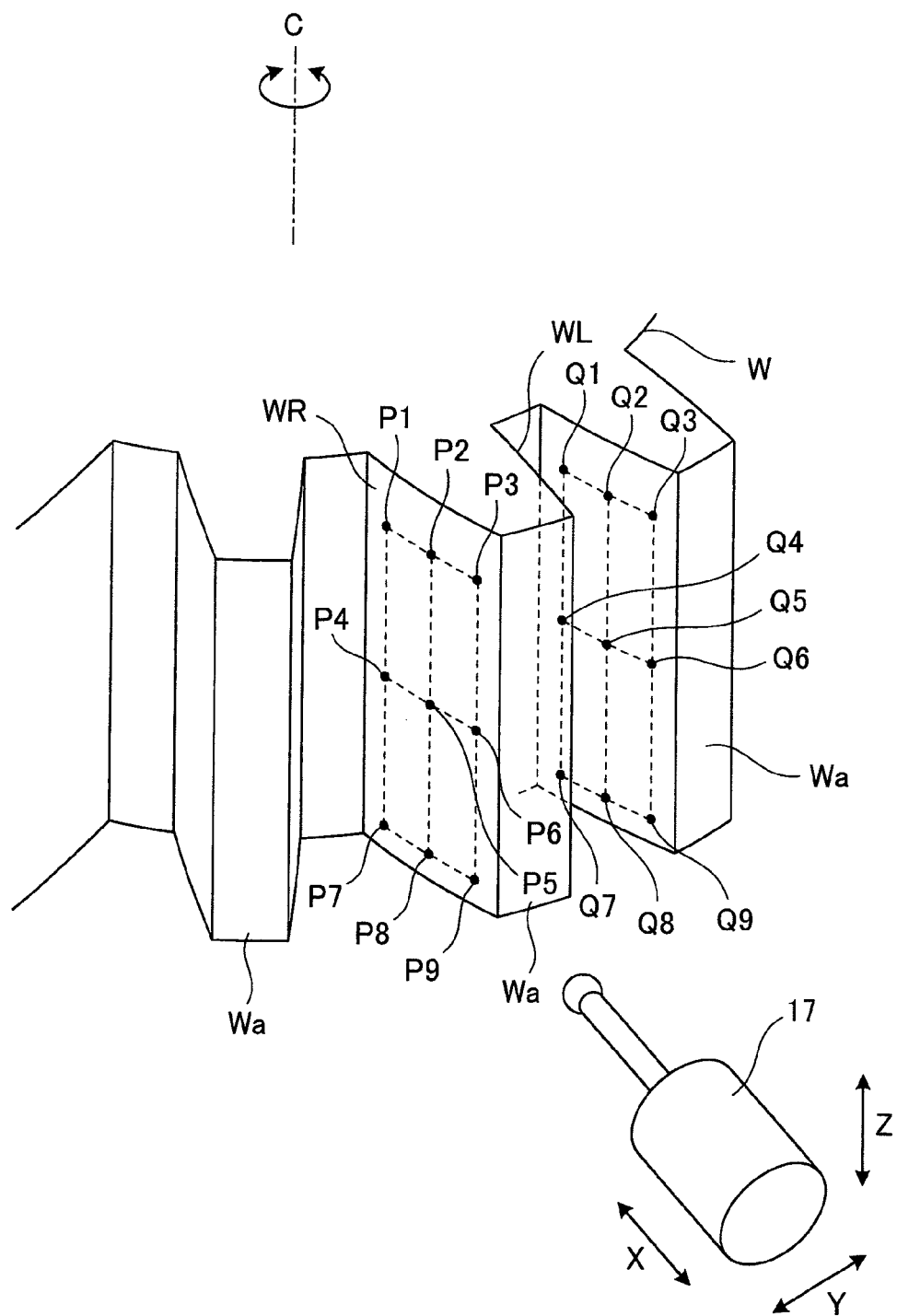
FIG. 2 is a diagram showing measurement points set in a grid pattern on both a left tooth surface and a right tooth surface of each predetermined tooth of a workpiece.

Note that although a detail description will be given later, as shown in FIG. 2 and FIG. 3, in the NC device 30 before the grinding described above, measurement points (P1 to P9) are set on the left tooth surface WL and the right tooth surface WR of each predetermined tooth Wa of the workpiece W. Thereafter, on the basis of rotation phases about the workpiece rotation axis C at the measurement points, the NC device 30 obtains tooth thickness deviation amounts e between a reference involute tooth surface and the measurement points set on the left tooth surface WL and the right tooth surface WR of the predetermined tooth Wa, as well as tooth thickness deviation amounts e between the reference involute tooth surface and corresponding points (Q1 to Q9) corresponding to the measurement points and located on the left tooth surface WL and the right tooth surface WR of each of all the teeth Wa other than the predetermined tooth Wa. Then, an initial cutting position X1 of the grinding wheel 15 in the X-axis direction is set in accordance with the largest deviation amount e among the tooth thickness deviation amounts e of the measurement points and the corresponding points.

In this respect, the predetermined teeth Wa for the measurement probe 17 to come into contact with are not all the teeth Wa, but are multiple teeth Wa placed at equal angular intervals in the circumferential direction of the workpiece W. In this embodiment, the measurement points are set on the left tooth surfaces WL and the right tooth surfaces WR of four teeth Wa placed at 90° intervals in the circumferential direction of the workpiece W, and the measurement probe 17 is brought into contact with the measurement points. Moreover, when approximate accuracy of approximate curves of deviation amounts to be described later is taken into consideration, the predetermined teeth Wa for the measurement probe 17 to come into contact with are preferably at least four or more teeth Wa placed at equal angular intervals in the circumferential direction of the workpiece W.

In addition, the measurement point is set as one point, i.e. the measurement point P5 which is at a center portion in the tooth depth direction and at a center portion in the tooth width direction on the left tooth surface WL and the right tooth surface WR of the predetermined tooth Wa. Note that when accuracy of setting the initial cutting position X1 is desired to be further improved in consideration of the degree of strain of the tooth Wa, many measurement points may be set as well.

Specifically, when the degree of strain of the tooth Wa in the tooth width direction (tooth trace direction) is to be particularly taken into consideration, for example, the measurement points are set as three points, i.e. the measurement points P2, P5, and P8 set in a center area in the tooth width direction and both side areas in the tooth width direction of the center portion in the tooth depth direction, on the left tooth surface WL and the right tooth surface WR of the predetermined tooth Wa.

Furthermore, when the degree of strain of the tooth Wa in the tooth width direction (tooth trace direction) and in the tooth depth direction (tooth profile direction) is to be particularly taken into consideration, for example, the measurement points are set as nine points, i.e. the measurement points P1 to P9 set in a grid pattern over a center area in the tooth width direction and both side areas in the tooth width direction of each of the center portion in the tooth depth direction, a tooth tip portion in the tooth depth direction, and a tooth root portion in the tooth depth direction, on the left tooth surface WL and the right tooth surface WR of the predetermined tooth Wa.

Note that the measurement points P1 to P9 correspond to reference points (not shown) on a reference involute tooth surface obtained from workpiece (gear) specifications, and the corresponding points Q1 to Q9 further correspond to the measurement points. The following description will provide a detailed description of the case where measurement points are set as the nine measurement points P1 to P9, and corresponding points are set as the corresponding points Q1 to Q9 corresponding to the measurement points P1 to P9.

Next, a detailed description will be given of operations of the gear grinding machine 1 with reference to FIG. 1 to FIG. 3.

As shown in FIG. 1, first, the workpiece W on which heat treatment has been performed after gear cutting is attached to the rotary table 21, and the measurement head 16 is driven to pivot the measurement probe 17 to the measurement position.

Next, as shown in FIG. 2, while the measurement probe 17 is moved in the X-, Y-, and Z-axis directions, the workpiece W is rotated about the workpiece rotation axis C to bring the measurement probe 17 into contact with the measurement points P1 to P9 set on the right tooth surfaces WR of the four teeth Wa for measurement use. Thereby, rotation phases about the workpiece rotation axis C at the measurement points P1 to P9 are detected.

Similarly, while the measurement probe 17 is moved in the X-, Y-, and Z-axis directions, the workpiece W is rotated about the workpiece rotation axis C to bring the measurement probe 17 into contact with the measurement points P1 to P9 set on the left tooth surfaces WL of the four teeth Wa used in the previous measurement. Thereby, rotation phases about the workpiece rotation axis C at the measurement points P1 to P9 are detected.

Note that, as described above, the measurement points P1 to P9 are set in advance to be in a grid pattern and to be placed at equal intervals in the tooth width direction and in the tooth depth direction. Thereby, the degree of strain in each of the left tooth surface WL and the right tooth surface WR can be found widely.

Then, an order analysis (Fourier transform or the like, for example) is performed by using the rotation phases, detected by the measurement probe 17, of the measurement points P1 to P9 set on the four left tooth surfaces WL and on the four right tooth surfaces WR. This provides estimations of the tooth thickness deviation amounts e between the left and right reference involute tooth surfaces serving as a preset machining target value (equivalent to a final cutting position Xn shown in FIG. 3, in this embodiment) and the measurement points P1 to P9 set on the left tooth surfaces WL and right tooth surfaces WR of the four teeth Wa, as well as estimations of the tooth thickness deviation amounts e between the left and right reference involute tooth surfaces and the corresponding points Q1 to Q9 corresponding to the measurement points P1 to P9 and located on the left tooth surfaces WL and right tooth surfaces WR of all the teeth Wa for non-measurement use other than the four teeth Wa.

As a result, the deviation amounts e can be approximated in the form of a curve for each of the measurement points P1 to P9 and the corresponding points Q1 to Q9 corresponding to the measurement points P1 to P9. Specifically, it is possible to obtain a total of 18 approximate curves of deviation amounts as shown in FIG. 3, including 9 approximate curves of deviation amounts for the measurement points P1 to P9 set on the 4 left tooth surfaces WL and the corresponding points Q1 to Q9 corresponding to the measurement points P1 to P9, and similarly, 9 approximate curves of deviation amounts for the measurement points P1 to P9 set on the 4 right tooth surfaces WR and the corresponding points Q1 to Q9 corresponding to the measurement points P1 to P9.

Note that the approximate curve of deviation amounts shown in FIG. 3 representatively shows one made from the measurement points P5 and the corresponding points Q5 on the right tooth surfaces WR of all the teeth Wa. Incidentally, the horizontal axis N indicates the tooth numbers of the teeth Wa, and the four teeth Wa for measurement use include a r1-th tooth, a r2-th tooth, a r3-th tooth, and a r4-th tooth, where r1<r2<r3<r4 and r1, r2, r3, r4 are positive integers greater than 1.

In addition, an assumption is made as follows: a deviation amount at the measurement point P5 set on the right tooth surface WR of the r1-th tooth Wa is e (r1-p5); a deviation amount at the measurement point P5 set on the right tooth surface WR of the r2-th tooth Wa is e (r2-p5); a deviation amount at the measurement point P5 set on the right tooth surface WR of the r3-th tooth Wa is e (r3-p5); and a deviation amount at the measurement point P5 set on the right tooth surface WR of the r4-th tooth Wa is e (r4-p5).

Next, on the basis of all the 18 approximate curves of deviation amounts, the largest of the deviation amounts e is selected from the measurement points P1 to P9 and the corresponding points Q1 to Q9 (the measurement point P5 set on the right tooth surface WR of the r1-th tooth Wa shown in FIG. 3, in this embodiment). Thereafter, the deviation amount e (r1-p5) at the measurement point P5 set on the right tooth surface WR of the r1-th tooth Wa is converted into a movement amount of the grinding wheel 15 in the X-axis direction.

Then, on the basis of the movement amount and the final cutting position Xn, a cutting start position Xo of the grinding wheel 15 in the X-axis direction is obtained. In addition, on the basis of the movement amount, the final cutting position Xn, and a cutting amount ΔX for one time (the cutting start position Xo and the cutting amount ΔX may be used), the number of cutting, the initial cutting position X1, a second cutting position X2, and subsequent cutting positions are obtained.

Specifically, the cutting start position Xo is a position where the grinding wheel 15 is positioned in the X-axis direction when the grinding wheel 15 is meshed with the workpiece W. Additionally, the cutting start position Xo is a position where an edge surface of the grinding wheel 15 comes into contact with the measurement point P5 set on the right tooth surface WR of the r1-th tooth Wa. Moreover, the grinding wheel 15 stepwisely performs cutting from the initial cutting position X1 in the X-axis direction by the predetermined cutting amount ΔX, and performs the cutting until finally reaching the final cutting position Xn. For each of the cutting positions X1, X2, ..., and Xn, feed of the grinding wheel 15 is provided in the Z-axis direction.

Next, by using all the 18 approximate curves of deviation amounts and the cutting positions X1, X2, ..., and Xn, positions obtained by converting the deviation amounts e in the X-axis direction are compared with the cutting positions X1, X2, ..., and Xn so as to determine whether or not there are a left tooth surface WL and a right tooth surface WR which are not in contact with the grinding wheel 15 for each of the cutting positions X1, X2, ..., and Xn. In this respect, when a left tooth surface WL and a right tooth surface WR which are determined as not being in contact with the grinding wheel 15 at the cutting positions X1, X2, ..., and Xn face each other in the same tooth space, what number teeth Wa have the left tooth surface WL and the right tooth surface WR facing each other is stored. Alternatively, rotation phases of the left tooth surface WL and the right tooth surface WR facing each other and the tooth space thereof are stored.

Specifically, a left tooth surface WL and a right tooth surface WR determined as not being in contact with the grinding wheel 15 at each of the cutting positions X1, X2, ..., and Xn and facing each other in the same tooth space are tooth surfaces not being in contact with the grinding wheel 15 even when feed in the Z-axis direction is provided for the grinding wheel 15. Accordingly, at such cutting positions X1, X2, ..., and Xn, feed in the Z-axis direction is not provided for the grinding wheel 15 (stop grinding operations of the grinding wheel 15).

Then, when the detection by the measurement probe 17 is completed, the measurement head 16 is driven to pivot the measurement probe 17 to the retreat position.

Next, the grinding wheel 15 is moved in the X-, Y-, and Z-axis directions, while the workpiece W is rotated about the workpiece rotation axis C to cause the grinding wheel 15 and the workpiece W to mesh with each other. Thereby, the grinding wheel 15 is positioned at the cutting start position Xo in the X-axis direction.

Then, the grinding wheel 15 placed at the cutting start position Xo is moved by the cutting amount ΔX in the X-axis direction and positioned at a machining start position which is set on the initial cutting position X1, and is then moved in the Z-axis direction. Thereby, the grinding wheel 15 positioned at the machining start position is moved on the initial cutting position X1, so that the left tooth surface WL and the right tooth surface WR facing each other in the same tooth space are ground. Furthermore, while the workpiece W is indexed about the workpiece rotation axis C on a tooth (space) basis, feed in the Z-axis direction is provided for the grinding wheel 15 positioned on the initial cutting position X1 in each tooth space. Thereby, grinding in the first round is performed.

In this respect, since the initial cutting position X1 is set based on the largest deviation amount e (r1-p5), the grinding wheel 15 never cuts too deeply into the left tooth surface WL and the right tooth surface WR regardless of the influence of the strain of the workpiece W. In addition, among the left tooth surfaces WL and the right tooth surfaces WR facing each other in the same tooth spaces, Those tooth surfaces stored as not being in contact with the grinding wheel 15 at the initial cutting position X1 are subjected to no grinding operations of the grinding wheel 15. The grinding wheel 15 skips to the next tooth space.

Subsequently, the grinding wheel 15 is further moved from the initial cutting position X1 in the first-round grinding, in the X-axis direction by the cutting amount ΔX to be positioned on the second cutting position X2, and is then moved in the Z-axis direction. Thereby, the grinding wheel 15 is moved on the second cutting position X2, so that the left tooth surface WL and the right tooth surface WR facing each other in the same tooth space are ground again. Furthermore, while the workpiece W is index about the workpiece rotation axis C on a tooth (space) basis, the grinding wheel 15 positioned on the second cutting position X2 in each tooth space is fed in the Z-axis direction. Thereby, grinding in the second round is performed.

Then, the operations described above are repeatedly performed until the grinding wheel 15 reaches the final cutting position Xn. Among the left tooth surfaces WL and the right tooth surfaces WR facing each other in the same tooth spaces, those tooth surfaces stored as not being in contact with the grinding wheel 15 at the cutting positions X2, ..., and Xn are subjected to no grinding operations of the grinding wheel 15. The grinding wheel 15 skips to the next tooth space.

Note that in this embodiment, the gear grinding method according to the present invention is applied to profile grinding using the grinding wheel 15 of a disc shape. However, the gear grinding method is also applicable to generating grinding using a threaded grinding wheel. Additionally, in the above description, the tooth thickness deviation amounts e at the measurement points P1 to P9 and the corresponding points Q1 to Q9 are set as deviation amounts with respect to the reference involute tooth surface. However, the measurement point P5 may be set as the reference point, and tooth thickness deviation amounts at the measurement points P1 to P4, P6 to P9 and the corresponding points Q1 to Q9 may be set as deviation amounts with respect to the measurement point P5, for example.

Hence, according to the gear grinding method of the present invention, on the basis of rotation phases at the measurement points P1 to P9 set on the left tooth surface WL and the right tooth surface WR of each predetermined tooth Wa of the workpiece W, the tooth thickness deviation amounts e between the final cutting position Xn serving as a machining target position and the measurement points P1 to P9, as well as the tooth thickness deviation amounts e between the final cutting position Xn and the corresponding points Q1 to Q9 corresponding to the measurement points P1 to P9 are obtained. Then, the initial cutting position X1 of the grinding wheel 15 is set based on the largest deviation amount e. For this reason, the cutting by the grinding wheel 15 immediately after the start of the machining does not become too deep and thus a grinding burn of the grinding wheel 15 can be avoided. Accordingly, it is possible to improve machining accuracy.

Additionally, for each of the cutting positions X1, X2, ..., and Xn, when the deviation amounts e in the left tooth surface WL and the right tooth surface WR facing each other in the same tooth space do not reach the cutting positions X1, X2, . . . , and Xn, the left tooth surface WL and the right tooth surface WR are not ground by the grinding wheel 15. For this reason, it is possible to avoid the no-contact (air cutting) state in which the grinding wheel 15 does not come into contact with the left tooth surface WL and the right tooth surface WR (air cutting). As a result, a loss in machining can be avoided, and thus machining time can be shortened.

Moreover, as described above, it is possible to prevent a grinding burn of the grinding wheel 15 and to shorten machining time by the grinding wheel 15. For this reason, the life of the grinding wheel 15 is improved and the dress interval of the grinding wheel 15 can be made longer.

In addition, the teeth Wa for measurement use are not all the teeth Wa, but the teeth Wa placed at equal angular intervals in the circumferential direction of the workpiece W. For this reason, it is possible to simplify rotation phase detection processing and deviation amount calculation processing.

Moreover, among the measurement points 21 to P9 set on the left tooth surface WL and the right tooth surface WR of each tooth Wa for measurement use, any of one point of P5, three points of P2, P5, P8, and nine points of P1 to P9 can be used to perform the measurement. Hence, in accordance with the degree of strain of the tooth Wa, the initial cutting position X1 can be set accurately and efficiently.

INDUSTRIAL APPLICABILITY

The present invention is applicable to a gear grinding method in which uneven grinding by a grinding wheel is prevented from occurring on a tooth surface of a gear to be machined.

The invention claimed is:

1. A gear grinding method in which rotation of a gear to be machined about a workpiece rotation axis, cutting by a grinding wheel in a radial direction of the gear to be machined, and feed of the grinding wheel in a workpiece rotation axis direction are controlled to grind the gear to be machined by the grinding wheel, the gear grinding method characterized in that the gear grinding method comprises:

setting measurement points on both left and right tooth surfaces of a predetermined tooth of the gear to be machined;

detecting rotation phases about a workpiece rotation axis at the measurement points;

obtaining tooth thickness deviation amounts between a preset reference involute tooth surface and the measurement points, as well as tooth thickness deviation amounts between the preset reference involute tooth surface and corresponding points corresponding to the measurement points and located on both left and right tooth surfaces of all teeth other than the predetermined tooth, on the basis of the detected rotation phases; and setting an initial cutting position of the grinding wheel on the basis of the largest of the deviation amounts.

2. The gear grinding method according to claim 1, characterized in that the gear grinding method further comprises:

determining on the basis of the deviation amounts and cutting positions from the initial cutting position to a final cutting position whether or not the grinding wheel comes into contact with the left tooth surface and the right tooth surface for each of the cutting positions, the cutting being made stepwise from the initial cutting position to the final cutting position; and providing the grinding wheel with no feed in the workpiece rotation axis direction at the cutting positions of the left tooth surface and the right tooth surface determined as where the grinding wheel does not come into contact.

3. The gear grinding method according to claim 1, characterized in that the predetermined tooth is a set of teeth placed at equal angular intervals in a circumferential direction of the gear to be machined.

4. The gear grinding method according to claim 1, characterized in that the measurement points are three points set in a center area in a tooth width direction and both side areas in the tooth width direction of a center portion in a tooth depth direction, on both the left tooth surface and the right tooth surface of the predetermined tooth.

5. The gear grinding method according to claim 1, characterized in that the measurement points are nine points set in a grid pattern on both the left tooth surface and the right tooth surface of the predetermined tooth.

* * * * *